United States Patent
Sugo et al.

(10) Patent No.: US 6,863,812 B2
(45) Date of Patent: Mar. 8, 2005

(54) COLLECTOR FOR ADSORPTIVE RECOVERY OF DISSOLVED METAL FROM SEA WATER

(75) Inventors: Takanobu Sugo, Gunma-ken (JP); Akio Katakai, Gunma-ken (JP); Noriaki Seko, Gunma-ken (JP)

(73) Assignee: Japan Atomic Energy Research Institute, Tokyo (JP)

( * ) Notice: Subject to any disclaimer, the term of this patent is extended or adjusted under 35 U.S.C. 154(b) by 0 days.

(21) Appl. No.: 10/427,942

(22) Filed: May 2, 2003

(65) Prior Publication Data

US 2003/0220033 A1 Nov. 27, 2003

Related U.S. Application Data

(63) Continuation of application No. 10/266,642, filed on Oct. 9, 2002, now Pat. No. 6,586,099, which is a continuation of application No. 09/983,507, filed on Oct. 24, 2001, now abandoned, which is a continuation of application No. 09/460,511, filed on Dec. 14, 1999, now Pat. No. 6,333,078.

(30) Foreign Application Priority Data

Dec. 14, 1998 (JP) ............................................ 10-354194
Dec. 14, 1998 (JP) ............................................ 10-354197

(51) Int. Cl.$^7$ ............................................. B01D 15/00
(52) U.S. Cl. ...................................................... 210/294
(58) Field of Search ........................................ 210/294

(56) References Cited

U.S. PATENT DOCUMENTS

| 4,601,889 A | 7/1986 | Sakamoto et al. |
| 4,622,366 A | 11/1986 | Sugo et al. |
| 4,678,844 A | 7/1987 | Sakuragi et al. |
| 4,693,828 A | 9/1987 | Yoshioka et al. |
| 5,064,879 A | 11/1991 | Shiga et al. |
| 5,200,473 A | 4/1993 | Jeanneret-Gris |
| 5,244,634 A | 9/1993 | Kingston et al. |
| 5,276,103 A | 1/1994 | Yoshiaki et al. |

FOREIGN PATENT DOCUMENTS

| JP | 58-205544 | 11/1983 |
| JP | 58-205545 | 11/1993 |
| JP | 2002-045708 | 2/2002 |
| RU | 2080174 | 5/1997 |
| SU | 1791391 | 1/1993 |

OTHER PUBLICATIONS

Saito et al, AIChE Journal, 34(3), pp 411–416, 1988.*
Tsuneda et al. J. Membr. Sci., 58(2), pp. 221–234, 1991.
Omichi et al. Sep. Sci. Technol., 21(3), pp. 299–313, 1986.
Sugo, Nippon Kaisui Gakkaishi, 51(1), pp. 20–27, 1997.
Katakai et al. Nihon Genshiryoku Gakkaishi, 40(11), pp. 878–880, 1998.
Kurashvili et al., Zh, Prikl. Khim., 65(5), pp. 991–4, 1992.
Mayer, Adv. Fitr. Sep. Technol., 4, pp. 14–29, 1991.
Suyama et al., Appl. Biochem. Biotechnol., 45–46, pp. 871–879, 1994.

* cited by examiner

Primary Examiner—Erma Cameron
(74) Attorney, Agent, or Firm—Banner & Witcoff, Ltd.

(57) ABSTRACT

A collector is disclosed that is made of a polyolefin fiber having amidoxime groups and that is capable of efficient adsorptive recovery of useful metals such as uranium, vanadium, cobalt and titanium which are dissolved in small quantities in seawater. In the presence of a polymerizable monomer having a hydrophilic group, a polymerizable monomer having a cyano group is grafted to a polyolefin fiber by radiation-initiated graft polymerization to form both a hydrophilic group and a cyano group in the same graft side chains, and the cyano groups in the graft side chains are reacted with hydroxylamine to be converted to amidoxime groups, thereby producing a collector capable of recovering dissolved metals from seawater.

3 Claims, 13 Drawing Sheets

GRAFTING TO NONWOVEN CLOTH

FUNCTIONAL GROUPS GENERATED DURING CONVERSION TO AMIDOXIME GROUP

Fig. 4
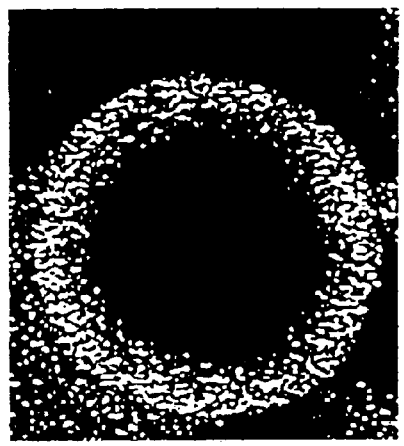
AFTER GRAFTING
IN VAPOR PHASE
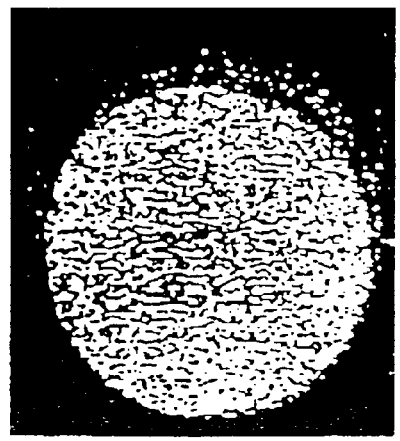
AFTER GRAFTING
IN LIQUID PHASE

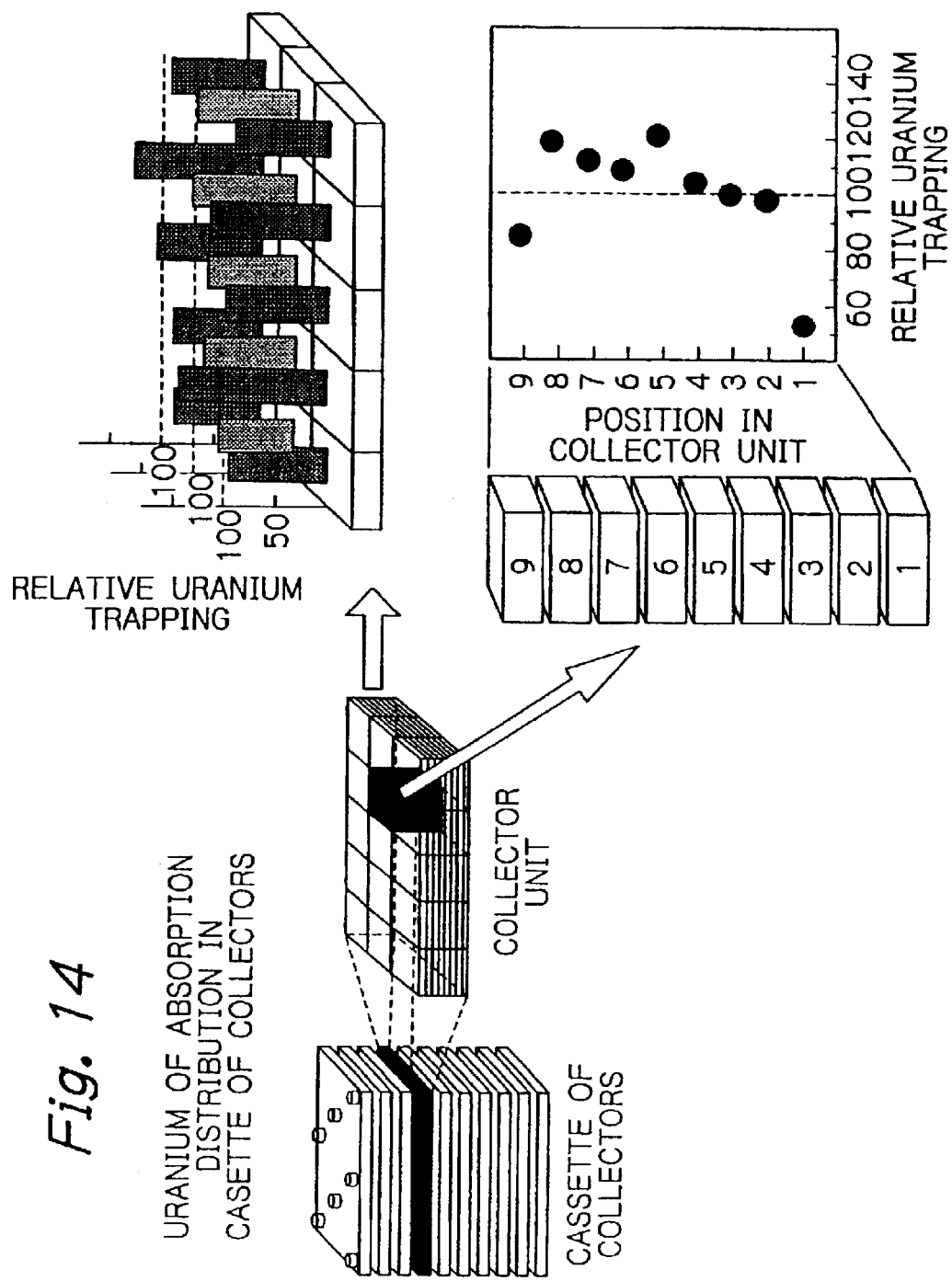

COLLECTOR FOR ADSORPTIVE RECOVERY OF DISSOLVED METAL FROM SEA WATER

This application continuation of and claims the benefit under 35 U.S.C. §120 of prior filed U.S. application Ser. No. 10/266,642, filed Oct. 9, 2002, now U.S. Pat. No. 6.586.099. which is a continuation of Ser. No. 09/983,507, filed Oct. 24, 2001, now abandoned which is a continuation of U.S. application Ser. No. 09/460,511, filed Dec. 14, 1999, now U.S. Pat. No. 6,333,078 (Dec. 25, 2001), which claims priority of Japanese Application No. 354194 filed Dec. 14, 1998 and Japanese Application No. 354197 filed Dec. 14, 1998.

BACKGROUND OF THE INVENTION (a) This invention relates to a collector made of a polyolefinic fiber having an amidoxime group and a hydrophilic group and which is capable of efficient adsorptive recovery of useful metals such as uranium, vanadium, cobalt and titanium that occur dissolved in small quantities in seawater. The invention also relates to a process for producing the collector.

Seawater has various metals (see Table 1) dissolved in it and the present invention aims at recovering these dissolved metals by adsorption using a collector.

TABLE 1

| Rare metal sources | Concentration in seawater, (mg/ton) | Total estimated dissolved quantity, (×10⁸ tons) | Dependency on overseas, (%) |
| --- | --- | --- | --- |
| Cobalt (Co) | 0.1 | 1 | 100 |
| Yttrium (Y) | 0.3 | 3 | 100 |
| Titanium (Ti) | 1 | 15 | 100 |
| Manganese (Mn) | 2 | 30 | 90 |
| Vanadium (V) | 2 | 30 | 100 |
| Uranium (U) | 3 | 45 | 100 |
| Molybdenum (Mo) | 10 | 150 | 100 |
| Lithium (Li) | 170 | 2,330 | 100 |
| Boron (B) | 4,600 | 63,020 | 100 |
| Strontium (Sr) | 8,000 | 109,600 | 100 |

(b) The invention relates to a collector that is produced by introducing an amidoxime group, either alone or in combination with a hydrophilic group, into side chains grafted to a polyolefinic fiber substrate and which needs only to be anchored in seawater to accomplish efficient recovery of useful metals such as vanadium, cobalt, uranium and titanium that are dissolved in the seawater. The invention also relates to a cassette of such collectors and a method of collecting the above-mentioned useful metals from seawater using the cassette.

To produce the collector of the invention, a polymerizable monomer such as acrylonitrile ($CH_2=CHCN$) that contains a cyan group (—CN) is grafted onto a polyolefinic fiber substrate by radiation-initiated graft polymerization so as to form grafted side chains and the cyan groups in these side chains are reacted with hydroxylamine ($NH_2OH$) or the like to be converted to amidoxime groups.

A plurality of the thus produced collectors may be sandwiched between nets and a plurality of the resulting assemblies are stacked in position at suitable spacings to construct a collector cassette. The cassette may be placed in a number of cages that are anchored in seawater to recover useful dissolved metals from it by adsorption.

(a) Conventionally, amidoxime groups are introduced into a polymer structure in accordance with the following scheme (1) by reacting the cyano group (—CN) with hydroxylamine ($NH_2OH$):

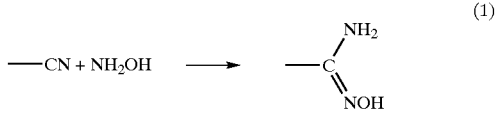

To synthesize a satisfactory amidoxime resin by introducing amidoxime groups into a polymer structure, the introduction of amidoxime groups into substrates typically made of the general-purpose polyacrylic fiber or polyacrylic beads produced by emulsion polymerization. However, these acrylic resins have suffered from deterioration in skeletal strength of the polymer on account of the introduction of hydrophilic amidoxime groups into the cyano groups in the polymer skeleton. With a view to preventing this problem, a review has been made to form crosslinks in the polymer structure. In fact, however, the increase in the degree of crosslinking is accompanied by a decrease in the rate of metal adsorption and this tradeoff has been an obstacle to the solution of the problem.

It is known that a collector that is capable of selective adsorptive recovery of dissolved metals from seawater can be produced by grafting acrylonitrile onto a polyethylene fiber under exposure to radiation and then reacting it with hydroxylamine to introduce amidoxime groups.

It is also known that a selective adsorbent of uranium dissolved in seawater can be produced from a substrate of a desired shape that is made of an inorganic material, an organic material or a composite thereof and into which both an amidoxime group and a hydrophilic group are introduced by radiation-initiated graft polymerization (see Japanese Patent Publication No. 58775/1987) filed by one of present inventors).

Under the circumstances, there has been a pressing need to improve the existing collectors and develop a material that is strong enough to withstand prolonged exposure to hostile weather conditions in ocean and which maintains high performance in collecting vanadium, uranium and other useful metals in seawater.

(b) In seawater, vanadium, uranium and many other rare metals that scarcely occur in Japan are contained dissolved but their concentrations are extremely low, only about 1.9 mg of vanadium per ton of seawater and about 3.3 mg of uranium.

Heretofore, uranium has been recovered from seawater by the following methods using an adsorbent; seawater is brought into contact with the particles of titanic acid to adsorb uranium from the seawater and fine air bubbles are attached to the particles of titanic acid, which are then floated on the seawater and separated therefrom to recover the uranium (Japanese Patent Public Disclosure No. 61018/1979); calcium or carbonate ions are removed from seawater before uranium in the seawater is recovered by adsorption onto a hydrous metal oxide adsorbent (Japanese Patent Public Disclosure No. 79111/1979); a collector produced by reacting a polyethyleneimine derivative with hydroxylamine is used to achieve adsorptive recovery of metal ions dissolved in seawater (Japanese Patent Public Disclosure No. 48725/1987); and using a kalixarene derivative to recover uranium in seawater by adsorption (Japanese Patent Public Disclosure No. 136242/1987).

Dissolved metals can also be recovered using chelate resins and conventional methods based on this approach include the following: a specified group is introduced into a chloromethylated crosslinked polystyrene, which is then reacted with hydroxylamine to produce an adsorbent resin that is used to recover dissolved metals from seawater by adsorption (Japanese Patent Public Disclosure No. 84907/1984); a chelate resin having malonyl dihydroxamate residue is used as an adsorbent to recover dissolved metals by adsorption (Japanese Patent Public Disclosure No. 83730/1984); and a chelate resin having functional groups of a specified structure in the molecule is used to recover dissolved metals by adsorption (Japanese Patent Public Disclosure No. 11224/1985).

To date, the conventional methods of recovering uranium from seawater using adsorbents or those for recovering dissolved metals using chelate resins have not been implemented in practice since they are incapable of cost-effective collection of uranium and other rare metals. However, for Japan which is by no means rich in mineral resources, it has been long desired to exploit the metals that are dissolved in the surrounding sea.

SUMMARY OF THE INVENTION (a) The present has been accomplished with a view to developing a material that is strong enough to withstand hostile weather conditions in ocean and which has high performance in collecting dissolved metals from seawater. To attain this object, the fiber of a polyolefin such as polyethylene or polypropylene that is a highly durable polymer is used as a substrate, side chains are grafted to the substrate polymer by radiation-initiated graft polymerization, and then an amidoxime group and a hydrophilic group are introduced into the same graft side chains.

The collector of the invention is produced by a process comprising the following steps: (1) to generate a reaction initiating species (radicals), a substrate comprising the fiber of a polyolefin such as polyethylene or polypropylene is exposed to electrons; (2) grafting a polymerizable monomer having a cyano group such as acrylonitrile ($CH_2$=CHCN) onto the polyolefin fiber in the presence of a polymerizable monomer having a hydrophilic group; and (3) then reacting the cyano groups in the graft side chains with hydroxylamine ($NH_2OH$) to convert them to amidoxime groups, whereby both amidoxime and hydrophilic groups are introduced into the same graft side chains.

If desired, grafting of the polymerizable monomer having a cyano group onto the polyolefin fiber in the presence of the polymerizable monomer having a hydrophilic group is performed at a properly adjusted molar ratio of the two polymerizable monomers and, thereafter, the cyano groups in the graft side chains are reacted with hydroxylamine ($NH_2OH$) to be converted to amidoxime groups, whereby the amidoxime and hydrophilic groups are introduced at a molar ratio of 70:30–30:70, preferably 60:40–40:60, more preferably 50:50.

(b) The collector of the invention needs only to be submerged and anchored in seawater such as the Kuroshio current so that slightly dissolved useful metals such as vanadium, uranium, cobalt, titanium and molybdenum are efficiently recovered from the seawater. The collector is characterized in that the fiber of a polyolefin such as polyethylene that is commonly used in oil fences is irradiated to introduce a chemical structure capable of selective trapping of metals.

Specifically, the collector of the invention can be produced by one of the following methods: (a) acrylonitrile is grafted to a substrate fiber in the form of either a nonwoven or woven cloth of the fiber of a polyolefin such as polypropylene or polyethylene and amidoxime groups are introduced into the graft side chains; (b) acrylonitrile and a polymerizable monomer having a hydrophilic group are co-grafted to the substrate fiber in either nonwoven or woven cloth form and amidoxime groups are introduced into the graft side chains made of acrylonitrile; and (c) the fiber of a polyolefin such as polypropylene is coated with a different polyolefin such as polyethylene to form a fiber of a core/sheath structure, a substrate is formed of this fiber in the form of either a nonwoven or woven cloth, either acrylonitrile or a polymerizable monomer having a hydrophilic group or both are grafted to the substrate fiber, and amidoxime groups are introduced into the graft side chains made of acrylonitrile.

For actual use, a plurality of such collectors are superposed and sandwiched between nets and a plurality of the resulting assemblies are stacked in position at suitable spacings to construct a cassette of collectors.

To collect dissolved metals from seawater, the cassette is placed in a number of corrosion-resistant cages, which are bound to a rope at suitable spacings; an anchor is attached to the submerged end of the rope and a buoy is attached to the other end so that the cassette is anchored in seawater either depthwise or laterally as long as the collectors are kept in contact with the seawater to collect dissolved metals from it.

BRIEF DESCRIPTION OF THE DRAWINGS

FIG. 4 shows two types of functional group distribution in the fractured surfaces of fibers produced by graft polymerization in the invention;

FIG. 14 shows two different distributions of uranium adsorption as observed in the collector cassette of the invention.

DETAILED DESCRIPTION OF THE INVENTION (a) To introduce amidoxime groups into a substrate of a polyolefin fiber made of highly endurable polyethylene (PE)

or polypropylene (PP) by radiation-initiated graft polymerization, the following scheme (2) may be employed:

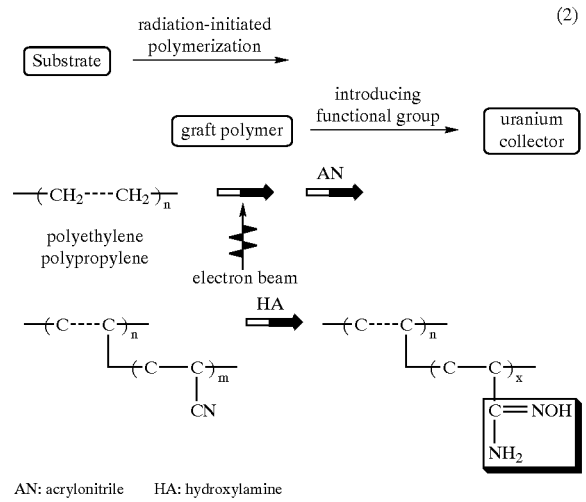

AN: acrylonitrile   HA: hydroxylamine

Figure 1:
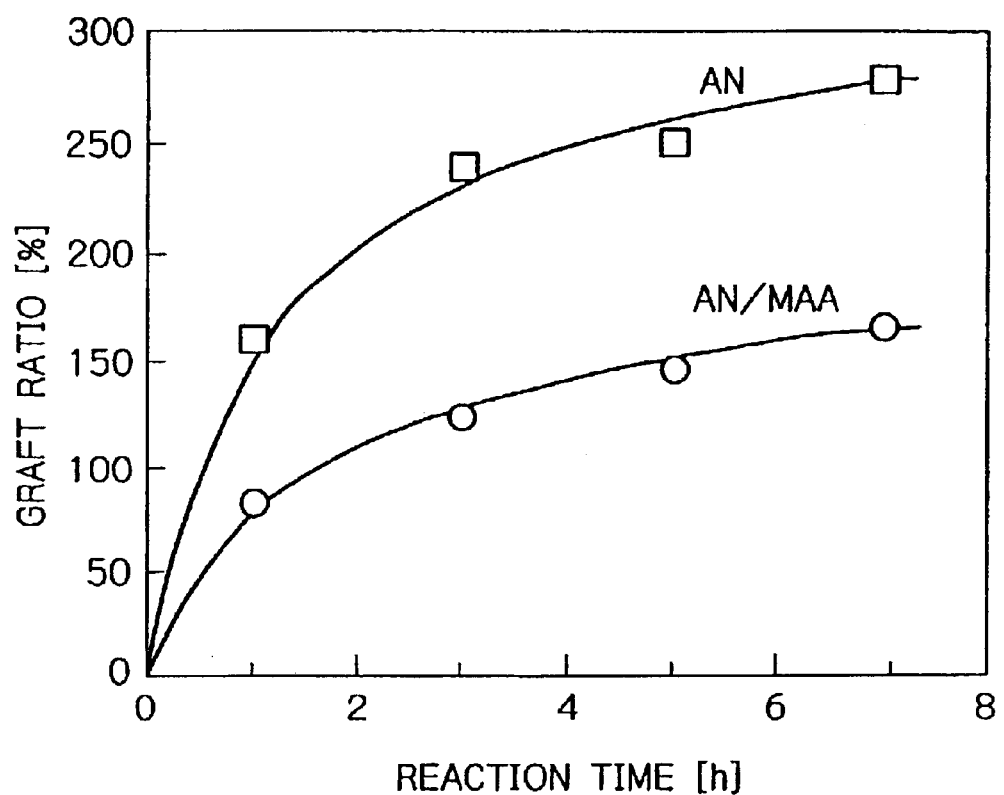
FIG. 1 is a graph showing the ratio of grafting onto a nonwoven cloth as a function of time in accordance with the invention.

When AN (acrylonitrile) or AN/MAA (methacrylic acid) were grafted to a nonwoven cloth made of a polyolefin fiber, the graft ratio (%) was related to the reaction time (h) as shown in FIG. 1. Obviously, the rate of AN grafting was high and a graft ratio of 150% was reached in one hour of the reaction. According to scheme (2), the cyano groups in graft side chains were converted to amidoxime groups in an efficiency of 70–80% and their concentration reached 7–8 mmol/g at a graft ratio of 100%.

Figure 2:
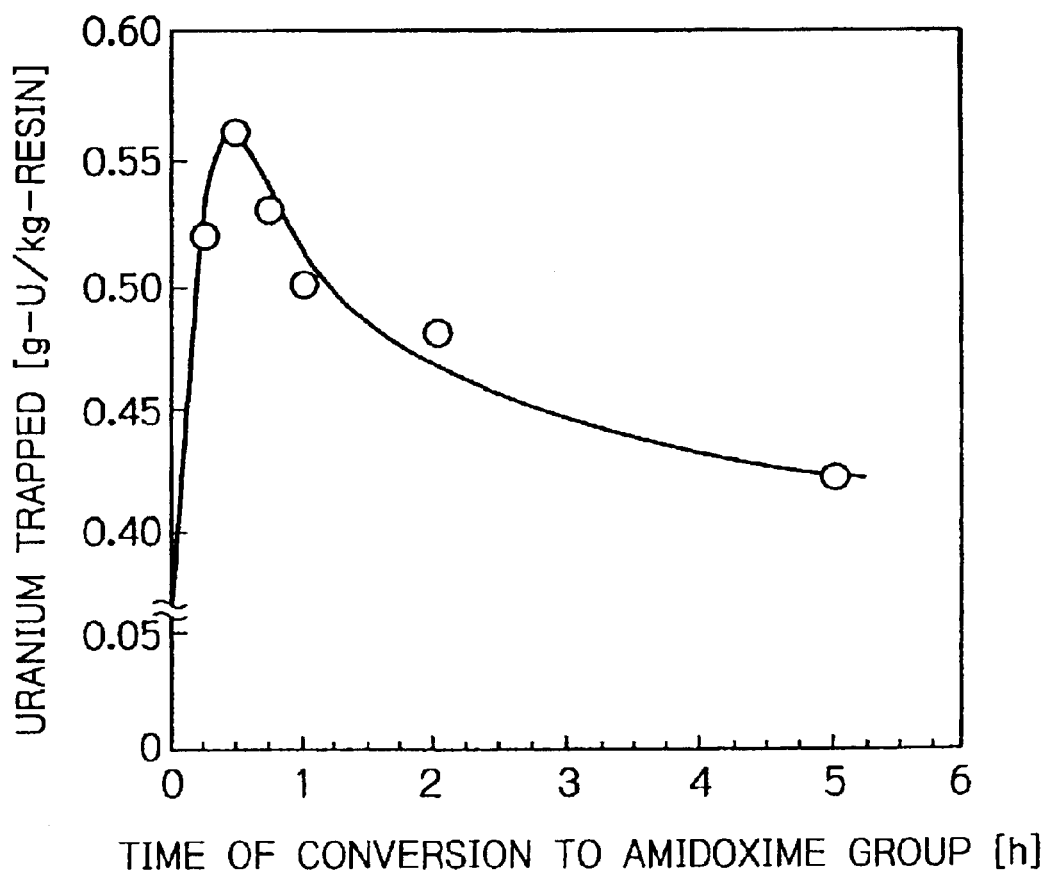
FIG. 2 is a graph showing the relationship between the reaction time for conversion to amidoxime groups and the rate of uranium trapping in accordance with the invention.

In the presence of MAA or various other vinyl monomers, AN can be co-grafted with such vinyl monomers; the curve connecting open circles in FIG. 1 shows the result of co-grafting of AN and MAA. By applying this co-grafting technique, both an amidoxime group (metal trapping functional group) and a hydrophilic group (carboxyl group) can be introduced into the fiber substrate. The time of reaction for converting the cyano groups in graft side chains to amidoxime groups and the rate of trapping dissolved uranium in seawater by means of the collector can be correlated as shown in FIG. 2. When the time of reaction for converting the cyano groups in the graft side chains to amidoxime groups was no longer than 30 minutes, the collector could trap an increasing amount of uranium; however, beyond 30 minutes of the reaction, the uranium trapping capability of the collector showed a tendency to drop sharply.

Figure 3:
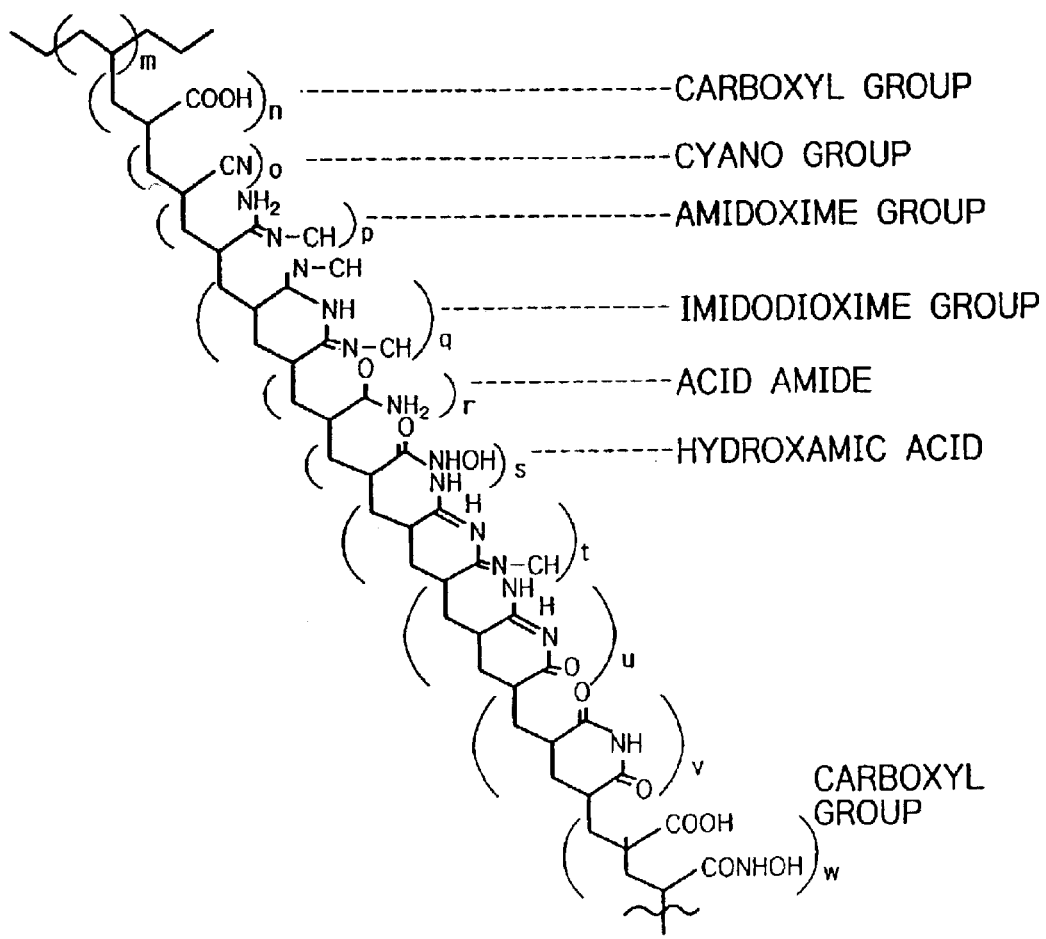
FIG. 3 shows the functional groups generated in the reaction for conversion to amidoxime groups.

This is because depending on the reaction conditions, the conversion to amidoxime groups involved side reactions as shown in FIG. 3. More specifically, as the generation of amidoxime groups proceeds, the reaction for ammonia removal occurs between two adjacent amidoxime groups to create a cyclic imidoxime group. The creation of a cyclic imidoxime group can be inhibited by adding methyl alcohol to the aqueous solution in the reaction system for conversion of cyano groups to amidoxime groups. Since the cyclic imidoxime group readily decomposes in an alkali solution, determining conditions for efficient formation of amidoxime groups is a critical factor to the synthesis of an effective collector of dissolved metals in seawater.

FIG. 4 shows two different distributions of a functional group (amidoxime group) in the fractured surfaces of fibrous amidoxime resins synthesized by the method shown in scheme (2). To obtain data, copper ions forming a complex with the fibrous amidoxime resin were saturated and adsorbed on the resin and their characteristic X-ray intensity distribution was determined with an X-ray micro-analyzer and shown graphically. In the pictures shown in FIG. 4, white spots represent the functional group and its distribution differed greatly depending on the specific method of grafting acrylonitrile. When irradiation of the fiber substrate with electron beams was followed by the grafting of acrylonitrile which was brought into contact with the substrate in a vapor phase, graft chains grew at high density on the fiber surface; when the reaction was performed in a liquid phase, the functional groups distributed uniformly into the bulk of the fiber.

Figure 5:
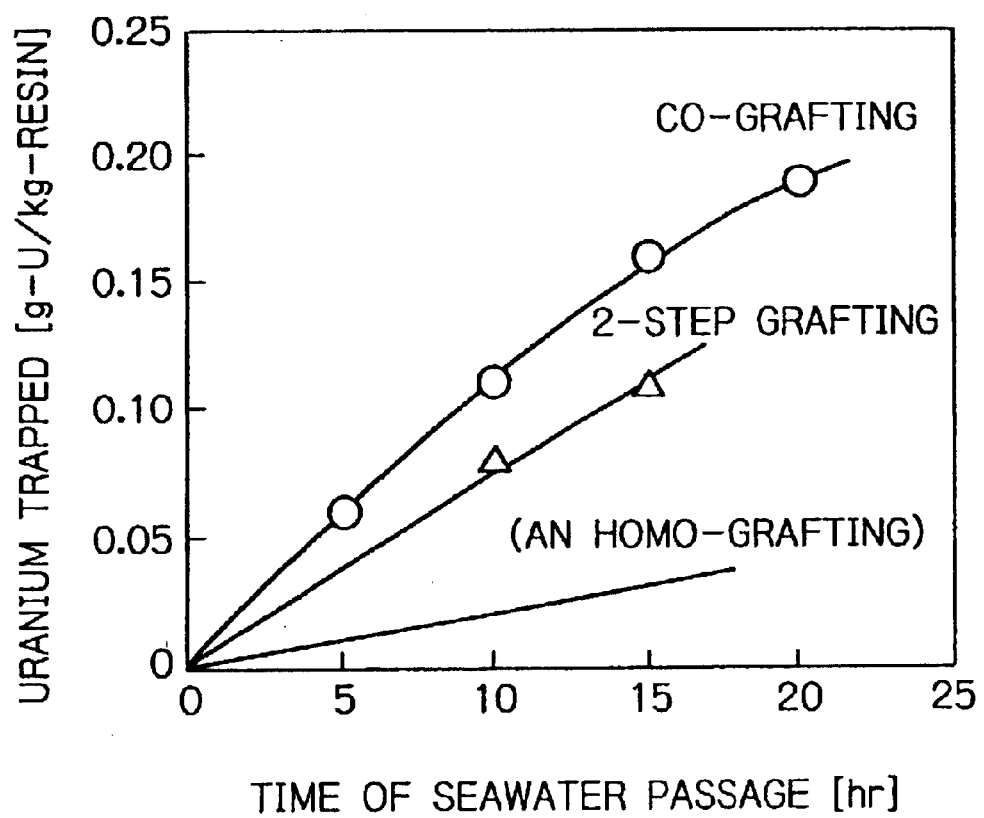
FIG. 5 is a graph comparing three methods of graft polymerization in terms of the rate of uranium trapping.

The concentration of dissolved uranium in seawater is extremely low (3 mg per ton of seawater) and, hence, increasing the efficiency of contact between the amidoxime group and the seawater is important for enhancing the rate of uranium trapping. This is why a molecular structure is needed that has hydrophilic groups present in the neighborhood of amidoxime groups. The two methods of graft polymerization (two-step grafting and co-grafting) for creating the stated molecular structure were compared with homo-grafting in terms of the rate of uranium trapping and the results are shown in FIG. 5.

In the presence of an acrylic acid having a hydrophilic group (carboxyl group), a molecular structure having hydroxyl groups in the neighborhood of amidoxime groups can be created by either co-graft polymerization or two-step graft polymerization. The rate of uranium trapping is markedly increased in the presence of a hydrophilic group and as is clear from FIG. 5, this effect is more conspicuous in co-grafting than in two-step grafting. In the two-step grafting method, an amidoxime group and a hydrophilic group are attached to different graft side chains; on the other hand, in the co-grafting method, both an amidoxime group and a hydrophilic group are introduced in the same graft side chain, permitting the hydrophilic group to act more effectively in combination with the amidoxime group.

The polymerizable monomers having a cyano group that can be used in the invention are acrylonitrile, vinylidene cyanide, crotononitrile, methacrylonitrile, chloroacrylonitrile, 2-cyanomethyl acrylate, 2-cyanoethyl acrylate and mixtures thereof. The polymerizable monomers having a hydrophilic group that can be used in the invention are 2-hydroxyethyl methacrylate, 2-hydroxyethyl acrylate, allyl alcohol, polyethylene glycol acrylate, polyethylene glycol methacrylate, polyethylene gylcol diacrylate, polyethylene glycol dimethacrylate, N-vinylpyrrolidone and acrylamide. The polyolefinic fiber to be used in the invention may be in the form of a woven cloth, a nonwoven cloth, a membrane or a tube.

Figure 6:
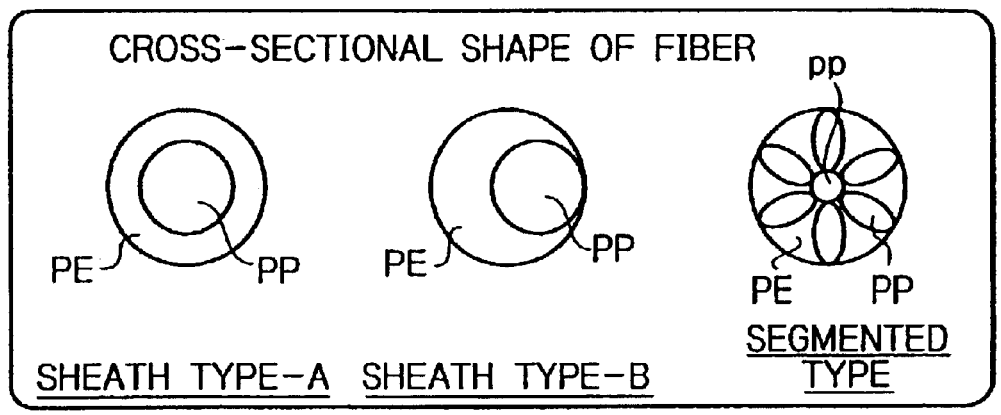
FIG. 6 shows three different cross-sectional shapes for the fiber used in the collector of the invention.

(b) Three specific examples of the substrate fiber in the collector of the invention for trapping dissolved metals in seawater are shown in FIG. 6; they comprise sheath types A and B each comprising a polypropylene (PP) core and a polyethylene (PE) sheath in fiber cross section, and a segmented type in which the cross section is divided into PE segments and PP segments. To produce the collector of the invention, acrylonitrile is grafted to the surface of the above-described substrate fiber by radiation-initiated graft polymerization and the resulting graft side chains are reacted with hydroxylamine to introduce amidoxime groups in the graft side chains. Collectors were produced from various substrate fibers and their diameter, AO (amidoxime) resin diameter (graft side chain diameter), graft ratio, AO group's concentration and U (uranium) adsorption are shown in Table 2, from which one can see how the performance of the collector in trapping uranium is affected by the cross-sectional shape of the fiber substrate.

TABLE 2

Collector Fabrication from Various Substrate Fibers (AO: amidoxime group)

| cross-sectional shape | constituent material | Substrate fiber diameter (denier) | Substrate fiber diameter (μm) | AO resin diameter | graft ratio (%) | AO group concentration (mmol/g) | U adsorption (mg/kg) |
|---|---|---|---|---|---|---|---|
| sheath type A | PE-PP | 2 | 16 | 28 | 130 | 5.7 | 120 |
| sheath type A | PE-PP | 10 | 36 | 80 | 110 | 5.8 | 76 |
| sheath type B | PE-PP | 3 | 20 | 40 | 130 | 5.5 | 100 |
| sheath type B | PE-PP | 18 | 46 | 100 | 120 | 6.2 | 70 |
| Segmented type | PE-PP | 2 | | 36 | 120 | 5.3 | 100 |
| circular type | PP | 6 | | 56 | 130 | 5.7 | 92 |
| triangular type | PP | 18 | | 140 | 140 | 6.2 | 72 |

Figure 7:
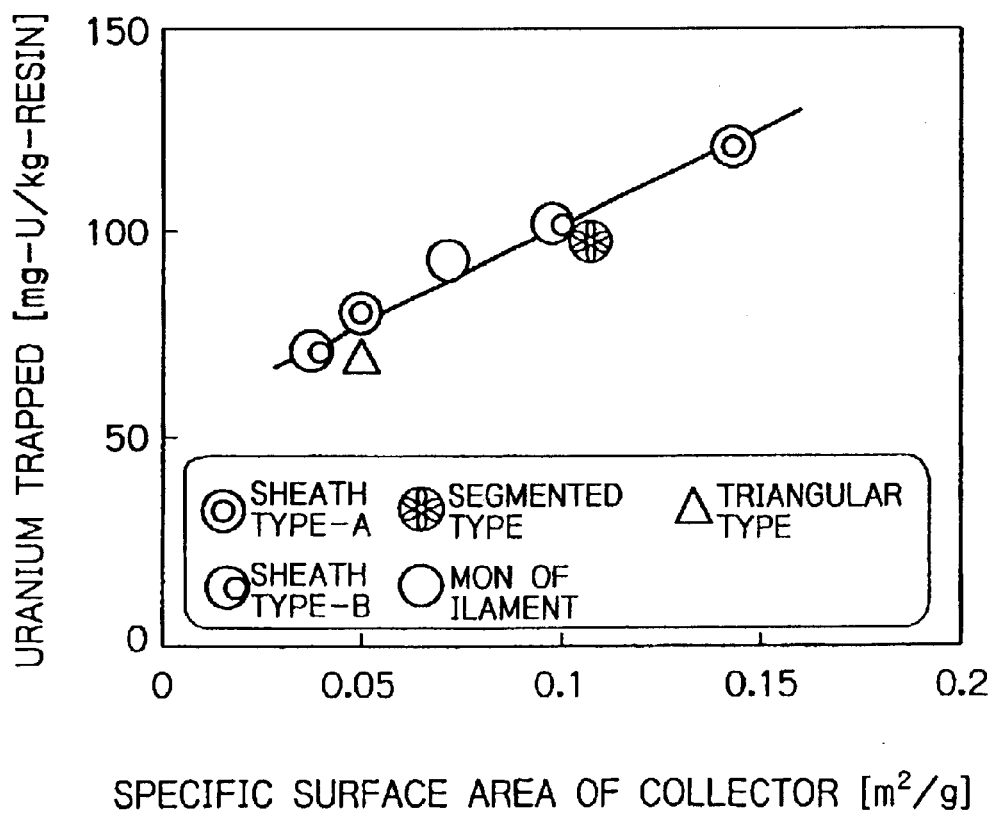
FIG. 7 is a graph showing how the rate of uranium trapping by the collector of the invention varies with its specific surface area.

The collector to be used in the invention may use a composite fiber substrate or a single fiber substrate; the former is classified as sheath type A, sheath type B or segmented type (see above) depending upon the cross-sectional shape of the fiber, and the latter is either circular or triangular in cross-sectional shape. In each of these cases, the substrate is composed of polyethylene and/or polypropylene. To this substrate, acrylonitrile is grafted by radiation-initiated graft polymerization and amidoxime groups are introduced into the resulting graft side chains, thereby producing the collector of the invention. FIG. 7 shows how the performance of five types of collector in trapping dissolved uranium in seawater varies with the specific surface area of the collector. Obviously, the rate of uranium trapping is independent of the collector type and shape but is greatly influenced by its specific surface area. FIG. 7 makes it clear that the collector can trap an increasing amount of uranium as its specific surface area increases.

To introduce both an amidoxime group and a hydrophilic group into the substrate fiber by radiation-initiated graft polymerization, a polymerizable monomer having a hydrophilic group is first grafted and then a polymerizable monomer having a cyano group is grafted to the polyolefinic fiber, and the cyano groups in the graft side chains are reacted with hydroxylamine so that they are converted to amidoxime groups, which occur in different graft side chains than those where the hydrophilic groups are present (this process is called "two-step grafting").

According to another method of introducing both an amidoxime group and a hydrophilic group into the substrate fiber by radiation-initiated graft polymerization, a polymerizable monomer having a cyano group is grafted to the substrate fiber in the presence of a polymerizable monomer having a hydrophilic group and, thereafter, the cyano groups in the resulting graft side chains are reacted with hydroxylamine so that they are converted to amidoxime groups, which occur in the same graft side chains as those where the hydrophilic groups are present (this process is called "co-grafting").

Various radiations may be used in graft polymerization and they include α-rays, β-rays, γ-rays, X-rays and accelerated electron beams. A polymerizable monomer may be grafted to the substrate by either simultaneous irradiation in which the substrate and the polymerizable monomer are simultaneously irradiated or pre-irradiation in which the polymerizable monomer is brought into contact with the already irradiated substrate.

Figure 8:
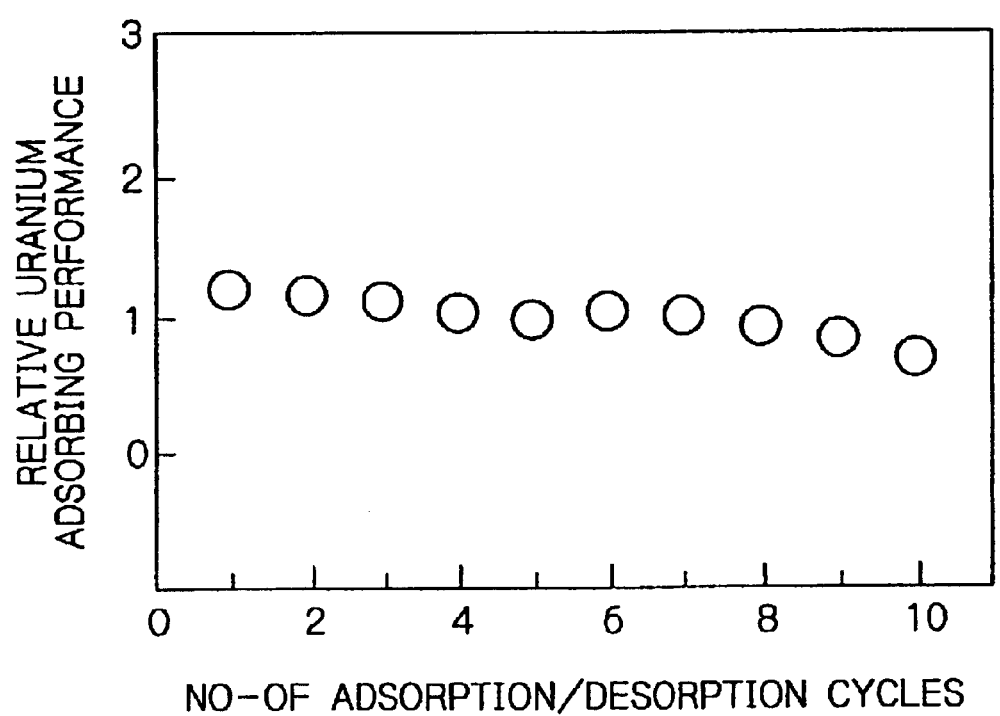
FIG. 8 is a graph showing the durability of the collector of the invention.
Figure 9:
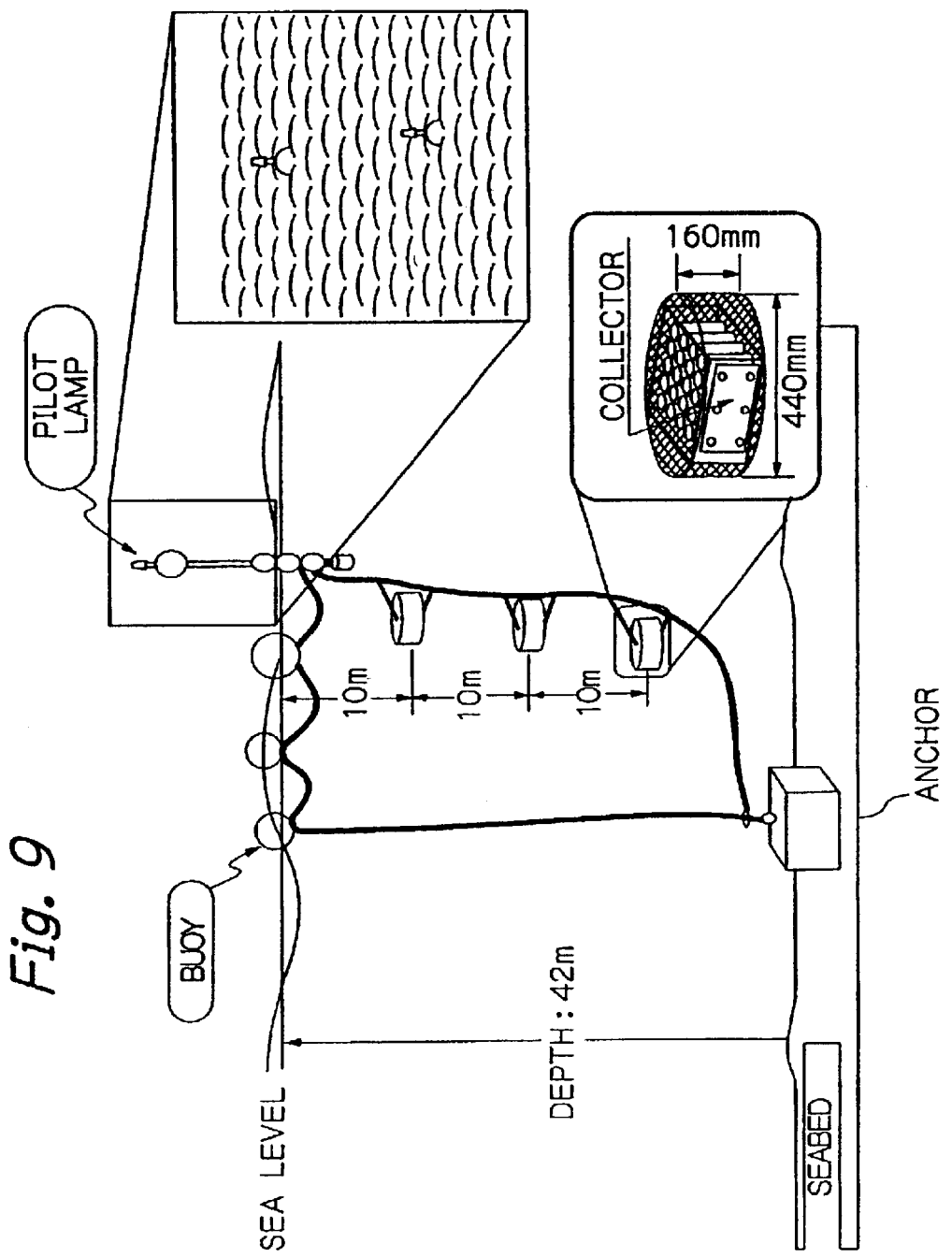
FIG. 9 illustrates how the collector of the invention is anchored in seawater to collect dissolved metals.

After trapping dissolved metals in seawater by adsorption, the collector of the invention is regenerated by an acidic solution such as hydrochloric acid, with which the trapped metal is desorbed and eluted from the collector. The durability of the collector is expressed by the number of adsorption and desorption cycles that can be performed before its performance drops to an impractical level and FIG. 8 shows the durability of the collector of the invention as evaluated by this criterion. The service durability of the collector is affected by the conditions for its fabrication, the conditions under which the adsorbed metal is eluted by the acidic solution and the duration of time for which the acidic solution is kept in contact with the collector; as is clear from FIG. 8, the performance of the collector of the invention in trapping uranium from seawater is such that it can withstand up to adsorption/desorption cycles.

The collector of the invention is capable of selective trapping of metals other than uranium that are dissolved in seawater. Table 2 lists the names and amounts of dissolved metals that can be trapped by contacting the collector of the invention with seawater for 20 days. Vanadium, cobalt, uranium and titanium were the principal metals that could be trapped.

TABLE 3

Collectable Useful Metals

| Useful metals | Concentration in seawater, (μg/kg) | Concentration in collector, (g/kg) |
|---|---|---|
| Uranium (U) | 3 | ~3 |
| Titanium (Ti) | 1 | ~2 |
| Vanadium (V) | 2 | ~6 |
| Cobalt (Co) | 0.1 | ~6 |

Note: Contact with seawater continued for 20 days.

The dissolved metals trapped by the collector of the invention have different energies of binding to the amidoxime group and, hence, they can be selectively eluted by controlling the concentration of hydrogen ion (pH) in the eluting acidic solution such as hydrochloric acid. As a result, the dissolved metals adsorbed on the collector can be efficiently recovered by selective eluting.

The following examples are provided for the purpose of further illustrating the present invention but are in no way to be taken as limiting.

EXAMPLE 1

Co-grafting; See FIG. 5

Fiber filaments (40 μm in diameter) of a tetrafluoroethylene/ethylene copolymer were exposed to 10 Mrad of electron beams from an electron accelerator (acceleration voltage, 1.5 MeV; beam current, 1 mA) in a nitrogen atmosphere. The irradiated filaments were placed in a reactor which was evacuated to $10^{-3}$ mmHg and charged with a solution of 2-hydroxyethyl methacrylate (HEMA) in methanol, the concentration of dissolved oxygen in which had been adjusted to no more than 0.1 ppm by nitrogen bubbling; thereafter, a 50 wt % solution of acrylonitrile (AN) in methanol that had been similarly adjusted by nitrogen bubbling was charged into the reactor and reaction was performed at 25° C. for 6 hours with the filaments being immersed in the reaction mixture. The resulting graft ratio was 15% for HEMA and 47% for AN.

The filaments thus acquiring HEMA and AN grafts were immersed in a solution of 3 wt % hydroxylamine hydrochloride in a 1:1 mixture (by weight) of water and methanol after it was neutralized with potassium hydroxide and reaction was performed at 40° C. for 2 hours to produce a collector having amidoxime groups. The anion exchange capacity of the collector which was equivalent to the concentration of amidoxime groups was 5.0 meq/g.

A portion (0.1 g) of the collector was immersed in 50 ml of seawater the vanadium concentration of which had been adjusted to 1 mg/L; the seawater was shaken at 30° C. for 1 hour to adsorb vanadium onto the collector. The result is shown in FIG. 5.

Comparable Example 1

Two-stage Grafting; See FIG. 5

Fiber filaments (40 μm in diameter) of a tetrafluoroethylene/ethylene copolymer were exposed to 10 Mrad of electron beams from an electron accelerator (acceleration voltage, 1.5 MeV; beam current, 1 mA) in a nitrogen atmosphere. The irradiated filaments were placed in a reactor which was evacuated to $10^{-3}$ mmHg and charged with a solution of 2-hydroxyethyl methacrylate (HEMA) in methanol, the concentration of dissolved oxygen in which had been adjusted to no more than 0.1 ppm by nitrogen bubbling; thereafter, reaction was performed at 25° C. for 6 hours with the filaments being immersed in the HEMA solution. The resulting graft ratio of HEMA was 15%.

By the same method as described above, the filaments with HEMA grafts were exposed to 10 Mrad of electron beams, immersed in a 50 wt % solution of acrylonitrile (AN) in methanol and reaction was performed at 25° C. for 6 hours. The resulting graft ratio of AN was 47%.

The filaments thus acquiring HEMA and AN grafts were immersed in a solution of 3 wt % hydroxylamine hydrochloride in a 1:1 mixture (by weight) of water and methanol after it was neutralized with potassium hydroxide and reaction was performed at 40° C. for 2 hours to produce a collector having amidoxime groups. The anion exchange capacity of the collector which was equivalent to the concentration of amidoxime groups was 5.0 meq/g.

A portion (0.1 g) of the collector was immersed in 50 ml of seawater the vanadium concentration of which had been adjusted to 1 mg/L; the seawater was shaken at 30° C. for 1 hour to adsorb vanadium onto the collector. The result is shown in FIG. 5.

Comparable Example 2

(AN Homo-grafting; See FIG. 5)

Fiber filaments (40 μm in diameter) of a tetrafluoroethylene/ethylene copolymer were exposed to 10 Mrad of electron beams from an electron accelerator (acceleration voltage, 1.5 MeV; beam current, 1 mA) in a nitrogen atmosphere. The irradiated filaments were placed in a reactor which was evacuated to $10^{-3}$ mmHg and charged with a 50 wt % solution of acrylonitrile (AN) in methanol, the concentration of dissolved oxygen in which had been adjusted to no more than 0.1 ppm by nitrogen bubbling; thereafter, reaction was performed at 25° C. for 6 hours with the filaments being immersed in the AN solution. The resulting graft ratio of AN was 47%.

The filaments thus acquiring AN grafts were immersed in a solution of 3 wt % hydroxylamine hydrochloride in a 1:1 mixture (by weight) of water and methanol after it was neutralized with potassium hydroxide and reaction was performed at 40° C. for 2 hours to produce a collector having amidoxime groups. The anion exchange capacity of the collector which was equivalent to the concentration of amidoxime groups was 5.0 meq/g.

A portion (0.1 g) of the collector was immersed in 50 ml of seawater the vanadium concentration of which had been adjusted to 1 mg/L; the seawater was shaken at 30° C. for 1 hour to adsorb vanadium onto the collector. The result is shown in FIG. 5.

Obviously, a molecular structure having hydrophilic groups present in the neighborhood of amidoxime groups is indispensable to improve the rate of trapping dissolved metals. Of the three methods of graft polymerization, homo-grafting, two-step grafting and co-grafting, the last-mentioned co-grafting process is the most suitable for adsorbing dissolved metals.

EXAMPLE 2

Trapping Performance of the Collector of the Invention

A collector cassette was placed in a stainless steel cage measuring 440 mm in diameter and 160 mm thick and anchored in seawater at depths of 10 m, 20 m and 30 m. Every 20 days, the amount of dissolved uranium trapped in the cassette was measured and the results are shown in FIG. 10.

The cassette contained the following three collectors:
(1) acrylonitrile (AN) was homo-grafted to a substrate fiber in the form of a polypropylene (PP) nonwoven cloth and amidoxime groups were introduced into the graft side chains; the collector prepared by this method is indicated by ●;
(2) AN and methacrylic acid (MAA) were co-grafted to the same substrate as in (1) to form AN and MAA graft side chains, and amidoxime groups were introduced into the AN graft side chains; the collector prepared by this method is indicated by ○; and
(3) AN and MAA were co-grafted to the surface of a substrate fiber in nonwoven cloth form having a core/sheath structure created by coating polypropylene (PP) filaments with polyethylene (PE), thereby forming AN and MAA graft side chains, and amidoxime groups were introduced into the AN graft side chains; the collector prepared by this method is indicated by □.

Figure 10:
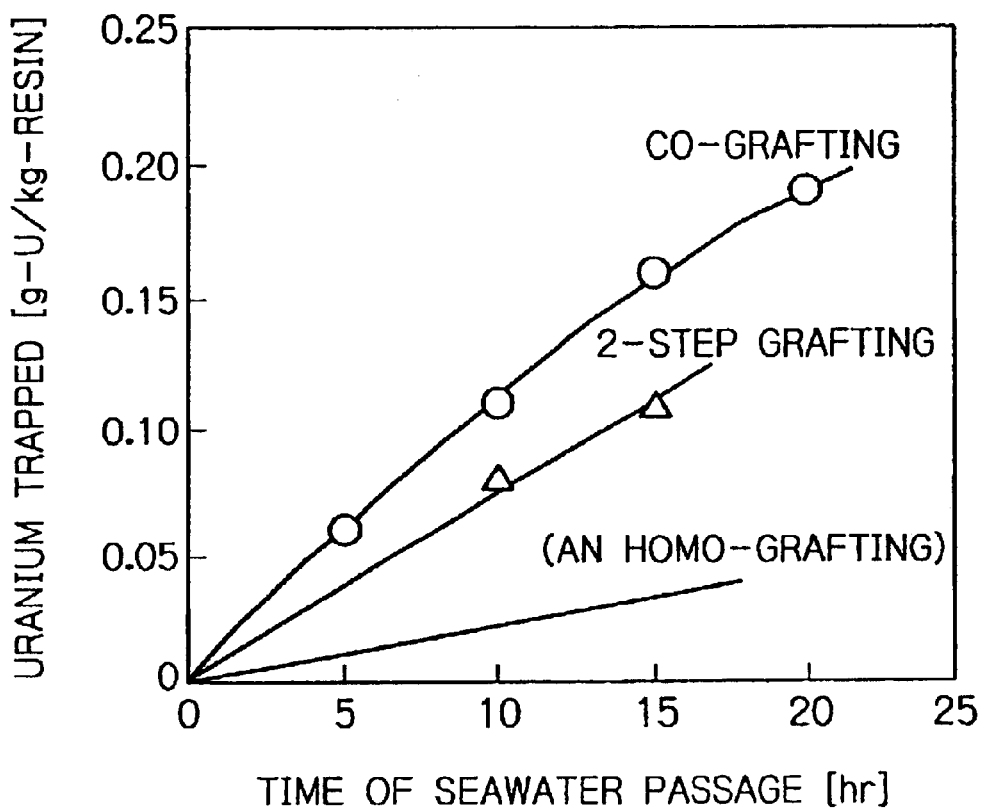
FIG. 10 is a graph showing how the results of uranium trapping by the collector of the invention vary with the method of graft polymerization.

As is clear from FIG. 10, the speed of uranium trapping by the collector (○) was about twice as fast as that of uranium trapping by the collector (●). This is due to the combined effect of the amidoxime group and the hydrophilic carboxyl group derived from MAA. The speed of uranium trapping by the collector (□) was about twice as fast as that of uranium trapping by the collector (○). This is due to the effect of the core/sheath structure of the fiber substrate. Thus, compared to the collector produced by homo-grafting, the speed of trapping uranium dissolved in seawater could be increased by a factor of about 4 by means of selecting the appropriate grafting method and substrate.

Figure 11:
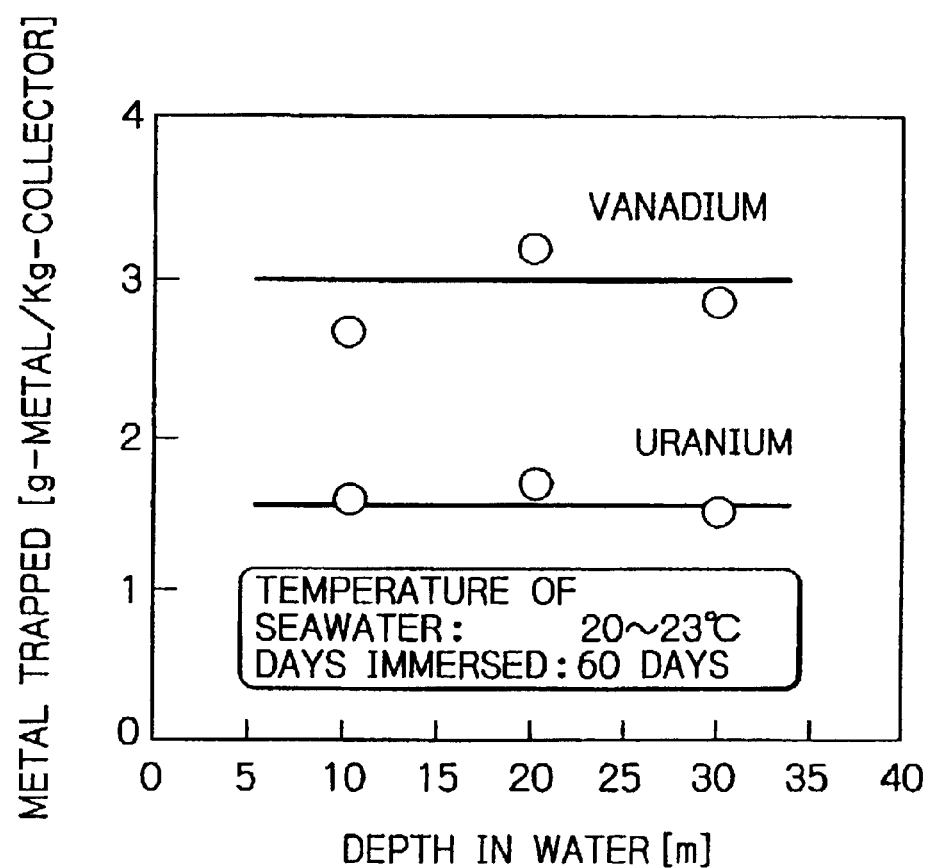
FIG. 11 is a graph showing how the adsorbing performance of the collector of the invention is affected by the depth to which it is submerged in seawater.

Using the collector (○) of sheath type A illustrated in FIG. 6, the amounts of uranium and vanadium trapped by the collector were measured at varying depths in seawater where it was anchored and the results are shown in FIG. 11, from which one can see that the amounts of uranium and vanadium trapped by the collector were substantially the same at varying depths from the sea level. Obviously, the adsorbing performance of the collector was independent of depth.

Figure 12:
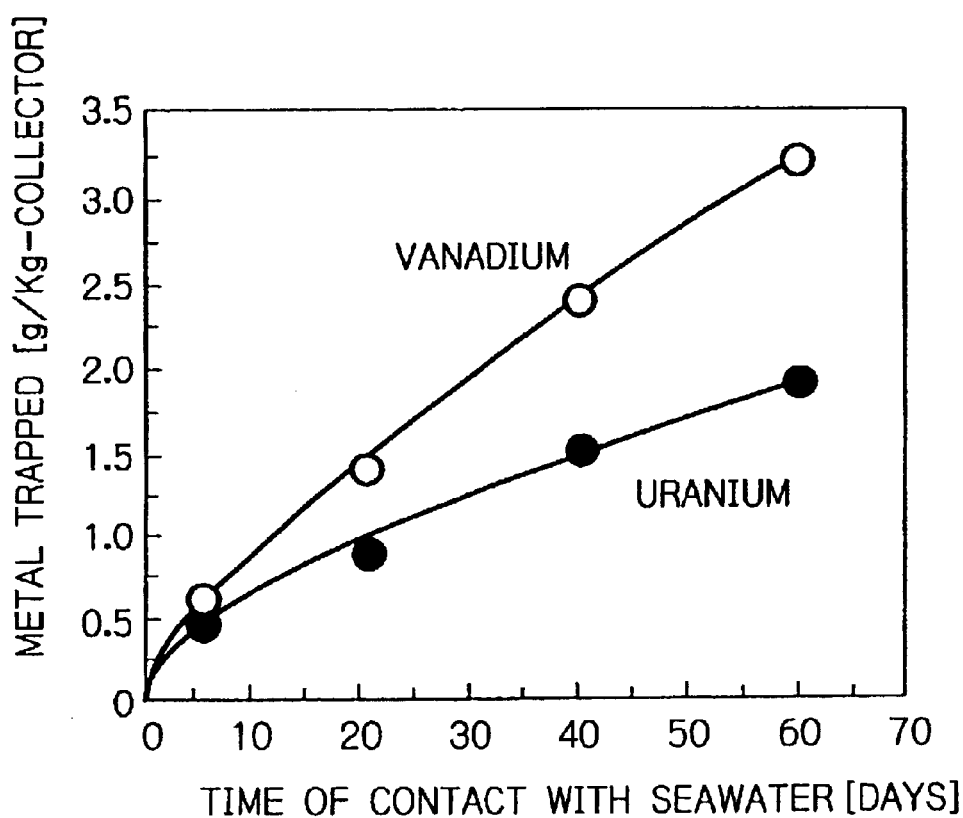
FIG. 12 is a graph showing the performance of the collector of the invention in trapping vanadium and uranium.

FIG. 12 shows the performance of the same collector (○) in trapping different useful metals (uranium and vanadium) dissolved in seawater. The collector had only to be immersed in seawater to trap not only uranium but also equally rare vanadium. According to FIG. 12, two grams of uranium were trapped per kilogram of the collector which was immersed in seawater for 60 days whereas as many as 3.2 grams of vanadium could be trapped in the same test (1.6 times as much as the uranium that could be trapped). The trapped uranium and vanadium were desorbed from the collector and purified to uranium oxide and vanadium pentoxide, respectively, for recovery.

EXAMPLE 3

Structure of the Dissolved Metal Collector Cassette of the Invention

Figure 13:
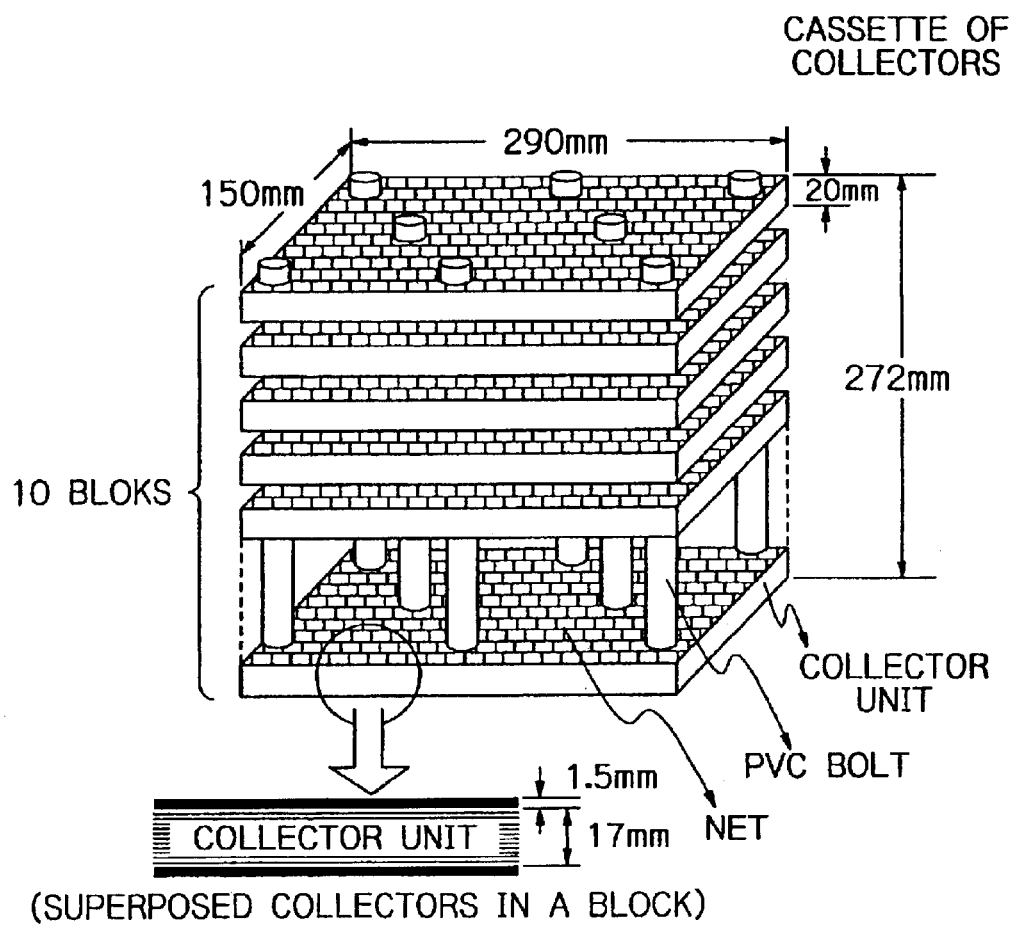
FIG. 13 illustrates the structure of the collector cassette of the invention.

The structure of the collector cassette used in Example 1 to trap dissolved metals in seawater is shown in FIG. 13. A plurality of collectors are superposed to a thickness of about 17 mm and sandwiched between two nets each having a thickness of about 1.5 mm to make a collector unit. A plurality of such collector units, say, in ten blocks, are stacked at suitable spacings and fixed by means of a plurality of polyvinyl chloride bolts to make a collector cassette measuring about 150 mm×200 mm and 272 mm in height.

This collector cassette was used to trap dissolved uranium in seawater and the distribution of uranium adsorption in the cassette is shown in FIG. 14. After uranium trapping by the cassette anchored in seawater, one of the collector units was cut into 5×3 sections and the adsorbed uranium was eluted to give the adsorption profile shown in the top right of FIG. 14, from which one can see that the amount of uranium adsorbed on the collector was little different between the periphery and the center of the cassette that was immersed in seawater. This uniformity in uranium adsorption profile across the surface of the cassette would be due to the provision of the 1.5 mm thick net between adjacent collector units (see FIG. 13) as a spacer that served as a passageway of seawater.

Another collector unit that was cut out of the cassette was vertically divided into nine equal parts and the uranium adsorption profile across the thickness of the unit is shown in the bottom right of FIG. 14; obviously, notwithstanding slight variation, the uranium adsorption by the cassette was fairly uniform across its thickness.

Effect of the Invention (a) According to the invention, highly durable polyethylene or polypropylene is subjected radiation-initiated graft polymerization and both an amidoxime group and a hydrophilic group are introduced into the same graft side chains without compromising the characteristics of the polymer; this contributed to develop a collector that was strong enough to withstand hostile weather conditions in ocean and which had high performance in trapping dissolved metals in seawater. The collector of the invention uses as the substrate the nonwoven cloth commonly used as an oil fence to prevent the spread of oil from a wrecked tanker; since the hydrophobic skeleton of the substrate and the grafted branches having functional (hydrophilic) groups exhibit different characteristics, the collector can withstand hostile ocean environments.

The radiation-initiated grafting performed in the invention can impart functional groups without impairing the characteristics of existing substrate shapes such as non-woven cloths. Therefore, according to the invention, a collector can be fabricated that achieves highly efficient contact with the large quantity of seawater that has been difficult to handle by the conventional technology.

(b) Unlike the conventional adsorbents, the collector of the invention features high capability for selective adsorption of dissolved metals in seawater, which can be recovered in concentrations $10^6$–$10^7$ times higher than those found in the seawater; in addition, the collector has sufficient corrosion resistance to seawater and can consistently be used for many times after regeneration.

In the collector of the invention, amidoxime groups are not attached to the skeleton of the substrate polymer that is made of a polyolefinic fiber but they are attached to graft side chains that extend like branches from the skeleton of the polymer; hence, the collector as anchored in seawater makes such a close contact with dissolved metals that it can adsorb them efficiently.

What is claimed is:

1. A collector cassette used to trap dissolved metals in seawater in which a plurality of collectors are superposed and sandwiched between two nets to make a collector unit and a plurality of such collector units are stacked at suitable spacing and fixed by bolts to make a collector cassette, the collector having an amidoxime group and a hydrophilic group for removing dissolved metals from seawater which is produced by the steps of, exposing a substrate fiber in the form of either a non-woven or woven cloth to a radiation to generate a reaction initiating radical on the fiber, wherein the nonwoven or woven cloth is made of a fiber of a core/sheath structure that has a polyolefinic fiber coated with a different polyolefin, co-grafting a polymerizable monomer having a cyano group onto the radiated polyolefin fiber in the presence of a polymerizable monomer having a hydrophilic group, and reacting the cyano groups in the graft side chains with hydroxylamine to convert them to amidoxime groups, whereby both amidoxime and hydrophilic groups are introduced into the same graft side chains and wherein the amidoxime group and hydrophilic groups are introduced at a molar ratio of 70:30–30:70.

2. A collector cassette in accordance of claim 1 wherein a polymerizable monomer having a cyano group is selected from the group consisting of acrylonitrile, vinylidene cyanide, crotonnitrile, methacrylnitrile, chloroacrylo-nitrile, 2-cyanomethyl acrylate, 2-cyanoethyl acrylate and mixtures thereof.

3. A collector cassette in accordance with claim 1 wherein a polymerizable monomer having a hydrophilic group is selected from the group consisting of 2-hydroxyethyl methacrylate, 2-hydroxyethyl acrylate, allyl alcohol, polyethylene glycol acrylate, polyethylene glycol methacrylate, polyethylene glycol diacrylate, polyethylene glycol dimethacrylate, N-vinylpyrrolidone and acrylamide.

* * * * *